June 9, 1942. J. L. BONANNO 2,285,560
ELECTROMAGNETIC DEVICE
Filed March 22, 1939

INVENTOR
JOSEPH L. BONANNO
BY
ATTORNEY

Patented June 9, 1942

2,285,560

UNITED STATES PATENT OFFICE 2,285,560

ELECTROMAGNETIC DEVICE

Joseph L. Bonanno, Maplewood, N. J., assignor to The Lionel Corporation, New York, N. Y., a corporation of New York Original application August 31, 1935, Serial No. 38,734. Divided and this application March 22, 1939, Serial No. 263,386

3 Claims. (Cl. 175—338)

The present invention relates to electromagnetic devices, and is more particularly directed toward electromagnetic devices designed to be unaffected by alternating current of predetermined voltage but responsive to distortion of the alternating current wave equivalent to the introduction of a small direct current voltage.

In certain fields, such for example as the toy train art, it is desirable to provide the train with a remote controlled accessory such as a whistle, lights or bell in addition to the propulsion motor. The present invention is particularly designed to provide for the operation of a whistle or other accessory on toy trains, this operation being entirely independent of the operation of the propulsion motor. The remote control circuit is, however, suitable for general application where conditions arise which are analogous to those involved in toy train operation.

The present invention contemplates a circuit having a source of alternating current potential such as a transformer of predetermined maximum voltage for operating a load such for example as lamps or propulsion motor. In addition to the accessory, which is normally connected to one side only of the current source, the circuit has a relay permanently connected in shunt with the load, this relay having contacts in the accessory circuit and being of the high reactance type designed so as not to close this circuit on the maximum alternating current potential which can be applied to it from the transformer. According to the present invention, this relay is adapted to function when a source of direct current of a small potential is introduced in series with the circuit. The direct current flows through the transformer and relay coils and effects a closing of the relay circuit when the direct current potential is applied and its opening when the direct current potential is removed, and this is utilized to control the circuit of the auxiliary device or signal such as a blower motor or a whistle, the actuating mechanism of a bell or any other current-consuming device adapted to operate on alternating current of the potential available.

The source of direct current for operating the relay may be a uni-directional conductor, such as a rectifier in series with the load circuit and normally shunted so as not to function, or in parallel with the load circuit and normally open-circuited so as not to function. When the rectifier is in circuit, it provides a sufficient amount of direct current to flow through the transformer coil and the relay coil to operate the relay. Instead of employing a rectifier it is also possible to introduce a battery such as an ordinary dry cell into the circuit. The amount of energy drawn from the dry cell during the short intervals of time the device is operated is small and the life of the battery satisfactory.

Other and further objects of the invention will appear as the description proceeds.

The present application is a division of my pending application Serial No. 38,734 filed August 31, 1935, for Remote control systems, methods and apparatus (now Patent No. 2,155,343, granted April 18, 1939).

The accompanying drawing shows, for purposes of illustrating the present invention, two of the many embodiments in which the invention may take form, it being understood that the drawing is illustrative of the invention rather than limiting the same.

Figure 2:
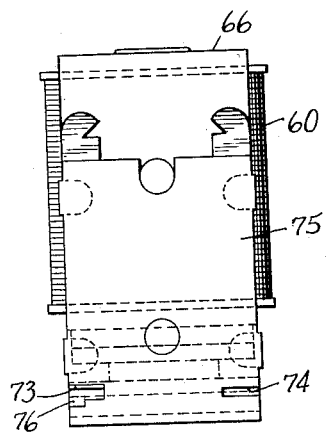
Figures 2 and 3 are side elevational and inverted plan views of the same.
Figure 1:
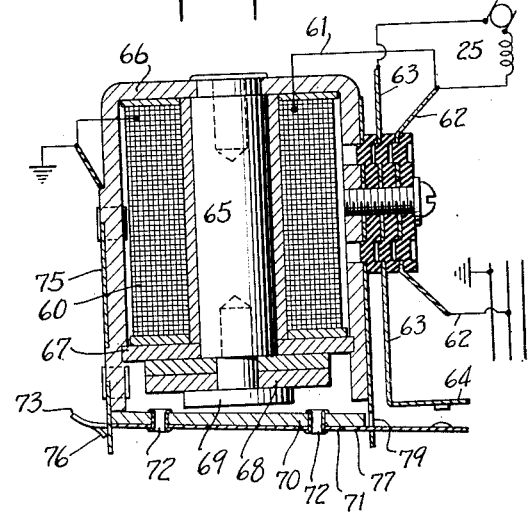
Figure 1 is a sectional view of an electromagnetic device in the form of a relay.
Figure 3:
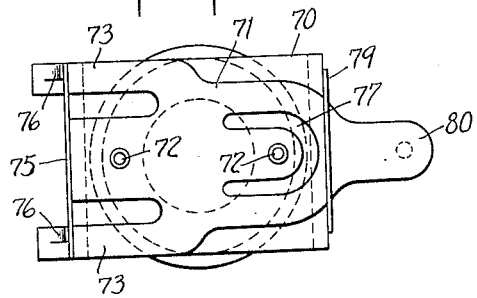

The electromagnetic device shown in Figures 1, 2 and 3 is provided with a coil 60 having one end connected by a wire 61 with an insulated terminal plate 62 and the other end grounded. This terminal plate is adapted to be connected by a wire 62' with the collector shoe bearing on the third rail. The terminal plate 62 is also connected through the field and armature of the motor or other accessory 25. The opposite side of this accessory is connected to an insulated relay contact 63 whose lower end is bent outwardly as indicated at 64.

The coil 60 is placed about a core 65 and the core is mounted in between a U-shaped body or yoke 66 and magnetic shunt 67 having low residual magnetism. The core 65 carries copper lag rings 68 and a core-head 69. The armature is indicated at 70. It is secured to an armature spring 71 by rivets indicated at 72. The armature spring has the configuration shown in Figure 3. It has two hinge-forming extensions 73, 73 adapted to pass through openings 74 in the hinge plate 75 and downwardly struck prongs 76 to prevent removal of the armature. These spring extensions are tensioned to exert a lifting action on the adjacent end of the armature and hold it against the yoke 66. The armature spring has a U-shaped slot indicated at 77 and extends through a slot in the plate 79. It has a contact 80 opposite the extension 64 on the contact member 63 so as to ground the accessory 25.

For the purposes above described, the relay is designed so as not to close on any alternating current voltage obtainable from the transformer in a toy railroad set-up. Where the maximum normal voltage is 25 volts, the closing voltage for the relay is kept above 28 to 30 volts.

It will be noted that the relay has a path of low reluctance for the alternating current flux, and that the leakage flux through the air gap to the armature is kept to a minimum by the design of the core-head and the copper lag rings. In the design, the portion of the core passing through the lag rings is made of very small cross section so as to increase the efficiency of the lag rings and produce a large drop in magnetomotive force through the air gap. On direct current the lag rings become ineffective and there is sufficient leakage flux in the air path (owing to the proportioning of the main core and shunt paths) to attract the armature mechanically and to hold the armature in the raised position.

Owing to the manner in which the armature is mounted at the pivot point, considerable lifting force is exerted at the hinge point by the springs 73 so as to obtain a good electrical and magnetic contact between the armature and adjacent end of the yoke. This good magnetic contact is available without in any way affecting the pull required to raise the armature, except for the slight amount of friction introduced at the hinge.

Figure 4:
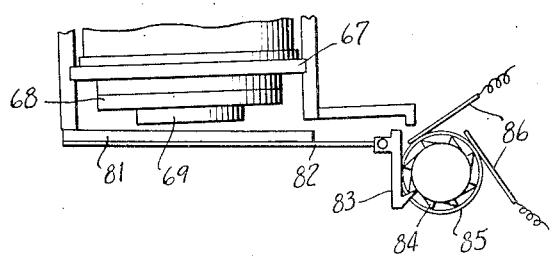
Figure 4 illustrates an electromagnetic device operating an indexing mechanism.

In the arrangement shown in Figure 4, the relay armature 81 is provided with an extension 82 carrying a ratchet pawl 83 cooperable with a ratchet wheel 84 on a drum 85. This drum may carry contacts for controlling auxiliary circuits in accordance with the position to which it is moved by the relay. With this type of relay, an operation is effected each time a direct current impulse is impressed on the line.

The primary magnetic circuit of the device is provided with a magnetic filter which comprises a magnetic shunt 67, a constricted core extension having a terminal polar enlargement, which is substantially larger than the core 65, and interposed between the shunt and the core enlargement is the non-magnetic lag ring or rings 68 of low electrical resistance. This arrangement effectively keeps the alternating current flux from attracting the armature while permitting a low amount of direct current flux to be effective, for example, the direct current flux resulting from a voltage of approximately one-half a volt direct current will suffice to operate the relay which is inactive when 30 volts of alternating current is supplied.

It is obvious that the invention may be embodied in many forms and constructions within the scope of the claims, and I wish it to be understood that the particular forms shown are but a few of the many forms. Various modifications and changes being possible, I do not otherwise limit myself in any way with respect thereto.

What is claimed is:

1. An electromagnetic device having a U-shaped magnet frame, a core secured to the bottom of the U, a magnetic shunt between the core and the frame and disposed adjacent the ends of the frame, a coil wound about the main portion of the core, the core having a portion beyond the magnetic shunt of smaller cross section than the main portion of the core, a polar enlargement carried by the core and having a gap area at least equal to the cross section of the main core, a lag ring fitted about the smaller cross section of the core, the frame, core, and shunt being fixedly secured together and forming a continuous path of ferro-magnetic material, and an armature extending across the end of the U and normally out of contact with at least one end of the frame, the lag ring and shunt acting to offer a path of high magnetic impedance between the shunt and armature for alternating current flux without appreciably affecting direct current flux, whereby the device will function on a very much lower direct current voltage than the maximum ineffective alternating current voltage.

2. In a relay, a U-shaped magnetic frame, a core secured to the middle of the U-shaped frame, a ferro-magnetic bridge surrounding the core near its outer end and engaging the core and ends of the frame, a coil about the core, a movable armature extending across the ends of the frame in spaced relation to the bridge, the bridge thereby forming a shunt path in parallel with the armature from the core to the frame, one end of the armature being normally in contact with one end of the frame, the other end of the armature being spaced from the said other end of the frame, a non-magnetic lag ring of low resistance between the shunt and the armature and surrounding an intermediate portion of the core end which protrudes beyond the shunt, said portion being of smaller cross-section than the remainder of the core, the said core end terminating in a head having a gap area at least as large as the cross-section of the main part of the core, which lag ring in cooperation with the shunt offers a path of high magnetic impedance between the shunt and armature for alternating current flux so that the armature is not attracted except on voltages above an effective voltage, the lag ring being ineffective to control flow of direct current flux whereby the device will function on a very much lower direct current voltage than the maximum ineffective alternating current voltage.

3. An electromagnetic device comprising a relatively fixed, rigidly assembled magnet structure and a single relatively movable armature carried thereby, the fixed magnet structure including a coil, a continuous ferro-magnetic path including a magnet frame, a magnetizable core about which the coil is wound and having one end secured to the frame, and a magnetic shunt between the other end of the core and the frame, the frame extending beyond the shunt to form poles opposite the armature, the core protruding beyond the shunt, and a non-magnetic lag ring of low resistance between the shunt and the armature and surrounding an intermediate portion of the core end which protrudes beyond the shunt, said portion being of smaller cross-section than the remainder of the core, the said core end terminating in a head having a gap area at least as large as the cross-section of the main part of the core, the lag ring being ineffective to control the flow of flux when subjected to direct current whereby the device is responsive to a predetermined direct current voltage, but being effective in cooperation with the shunt to offer a path of high magnetic impedance between the shunt and the armature for alternating current flux whereby substantially greater alternating current voltages are necessary before the armature may be attracted.

JOSEPH L. BONANNO.